(12) United States Patent
Erickson

(10) Patent No.: US 11,274,761 B2
(45) Date of Patent: Mar. 15, 2022

(54) FAUCET WITH INTEGRATED VALVE

(71) Applicant: Kohler Co., Kohler, WI (US)

(72) Inventor: Perry Erickson, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 20 days.

(21) Appl. No.: 16/560,697

(22) Filed: Sep. 4, 2019

(65) Prior Publication Data

US 2020/0080656 A1    Mar. 12, 2020

Related U.S. Application Data

(60) Provisional application No. 62/727,699, filed on Sep. 6, 2018.

(51) Int. Cl.
  *E03C 1/04*    (2006.01)
  *F16K 11/00*   (2006.01)

(52) U.S. Cl.
  CPC .............. *F16K 19/006* (2013.01); *E03C 1/04* (2013.01)

(58) Field of Classification Search
  CPC ........ E03C 1/04; E03C 1/0401; E03C 1/0404; E03C 2001/0414; F16K 19/006
  USPC ...................................... 137/801; 4/678, 695
  See application file for complete search history.

(56) References Cited

U.S. PATENT DOCUMENTS

| | | | |
|---|---|---|---|
| 2,463,179 A | 3/1949 | Iftiger | |
| 3,251,122 A | 5/1966 | Boteler | |
| 4,281,857 A * | 8/1981 | Randall | ................. E03C 1/0401 24/498 |
| 5,094,258 A | 3/1992 | Orlandi | |
| 5,188,399 A | 2/1993 | Durina | |
| 5,194,156 A | 3/1993 | Tomchak | |
| 5,403,043 A | 4/1995 | Smet | |
| 5,510,031 A | 4/1996 | Knauf | |
| 5,681,028 A | 10/1997 | Cook | |
| 5,918,626 A | 7/1999 | Strong | |
| 6,006,784 A | 12/1999 | Tsutsui | |
| 6,014,985 A | 1/2000 | Warshawsky | |
| 6,195,818 B1 | 3/2001 | Rodstein | |
| 6,202,686 B1 | 3/2001 | Pitsch | |
| 6,385,798 B1 | 5/2002 | Burns | |
| 6,425,571 B1 | 7/2002 | Schadewald | |
| 7,806,141 B2 | 10/2010 | Marty | |
| 8,051,507 B2 | 11/2011 | Lin | |
| 8,231,318 B2 | 7/2012 | Pitsch | |
| 8,469,056 B2 | 6/2013 | Marty | |
| 8,899,259 B2 * | 12/2014 | Jonte | ..................... E03C 1/0402 137/315.12 |
| 8,931,500 B2 | 1/2015 | Thomas | |
| 9,062,796 B2 | 6/2015 | Horsman | |
| 9,303,774 B2 | 4/2016 | Lomax | |
| 9,403,304 B2 | 8/2016 | Thomas | |

(Continued)

FOREIGN PATENT DOCUMENTS

| | | |
|---|---|---|
| FR | 3029259 | 6/2016 |
| WO | WO 2008/058320 | 5/2008 |

*Primary Examiner* — Paul J Gray
(74) *Attorney, Agent, or Firm* — Foley & Lardner LLP

(57) ABSTRACT

A faucet that includes an external body having a base and a spout extending from the base; a unitary valve structure having a cup disposed in the external body and a tubular mount extending downwardly beyond the external body; a valve supported in the cup of the valve structure; and a locking assembly that detachably locks to the mount of the valve structure.

18 Claims, 18 Drawing Sheets

(56) References Cited

U.S. PATENT DOCUMENTS

| | | |
|---|---|---|
| 9,487,936 B2 | 11/2016 | Sallah |
| 2004/0117906 A1 | 6/2004 | Baker |
| 2008/0099089 A1* | 5/2008 | Yang .................. F16K 11/0445 137/625.48 |
| 2008/0179559 A1 | 7/2008 | Kacik |
| 2009/0276954 A1* | 11/2009 | Davidson ............. E03C 1/0401 4/695 |
| 2014/0246099 A1 | 9/2014 | Herbert |
| 2015/0107019 A1 | 4/2015 | Schmitt |
| 2016/0017578 A1 | 1/2016 | Chang |

* cited by examiner

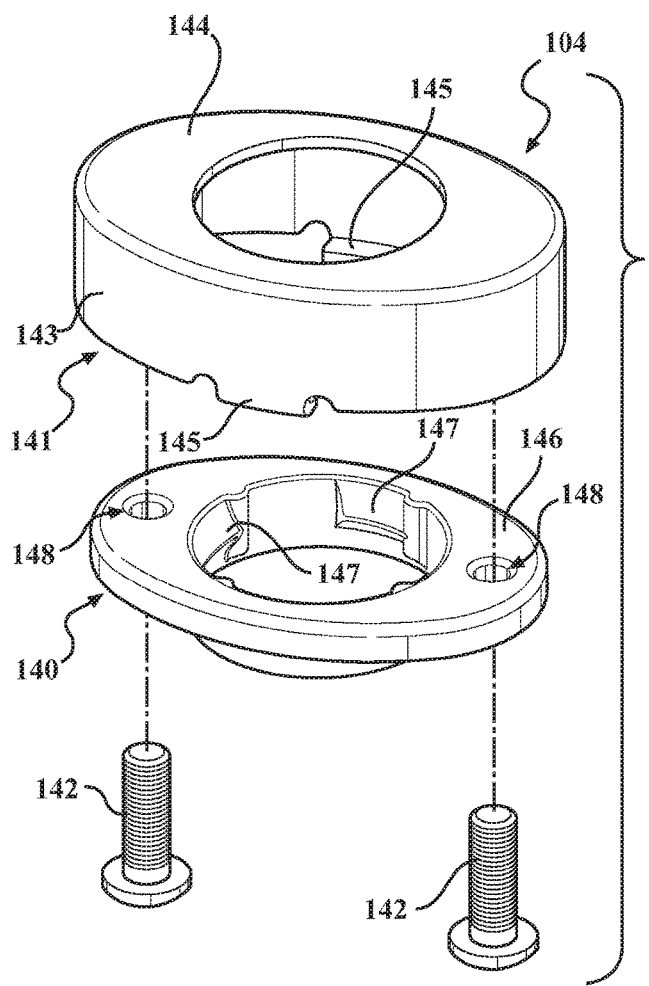
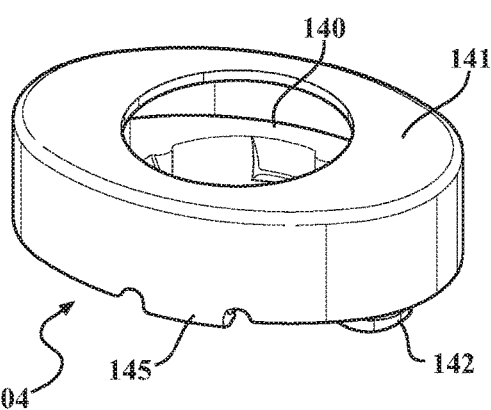
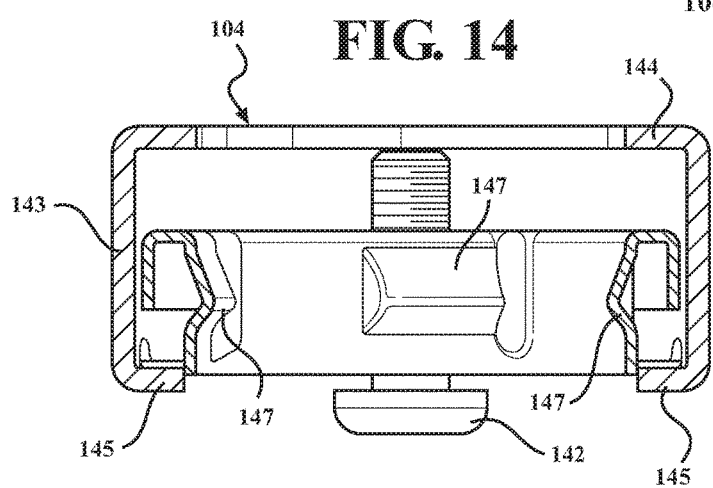

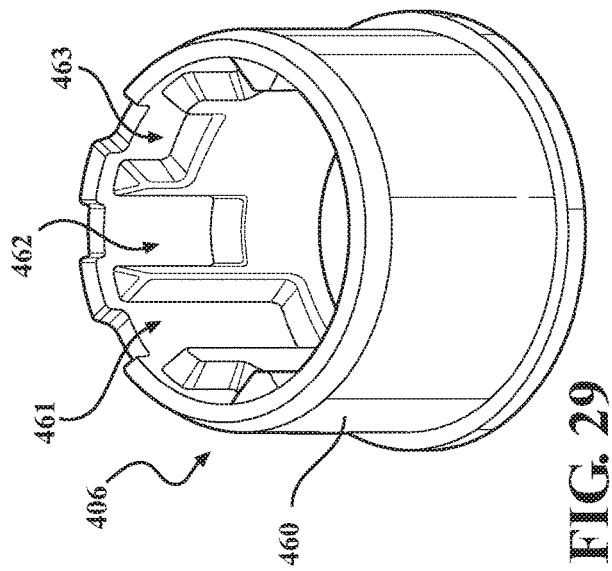
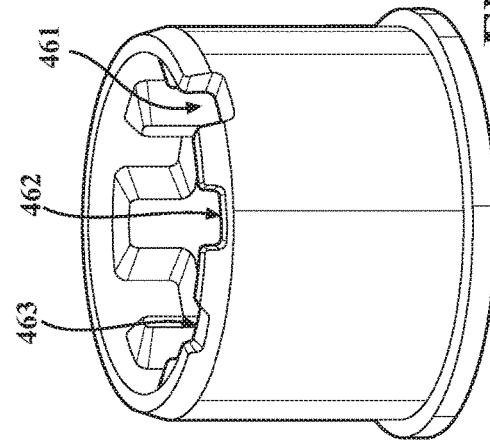
FIG. 29  FIG. 30
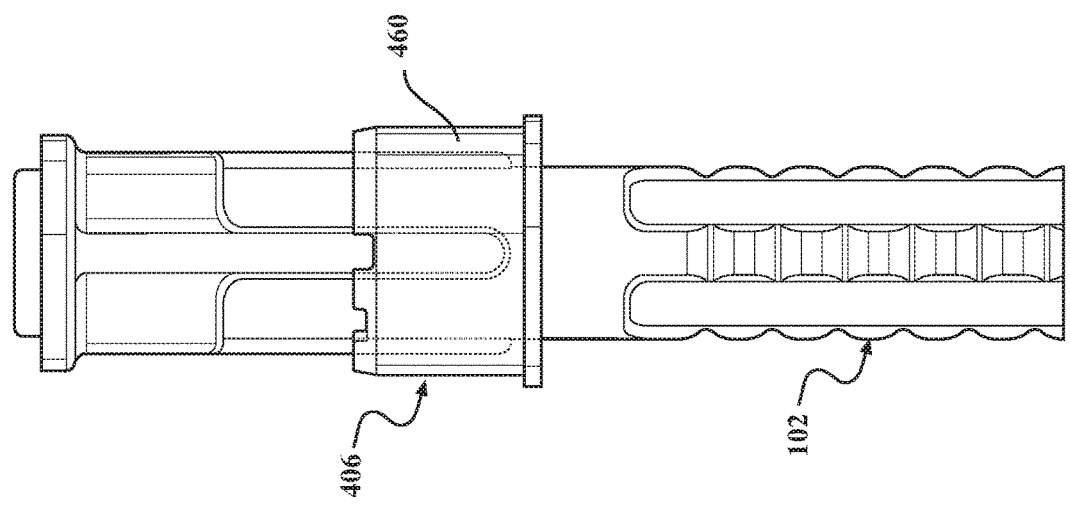
FIG. 28
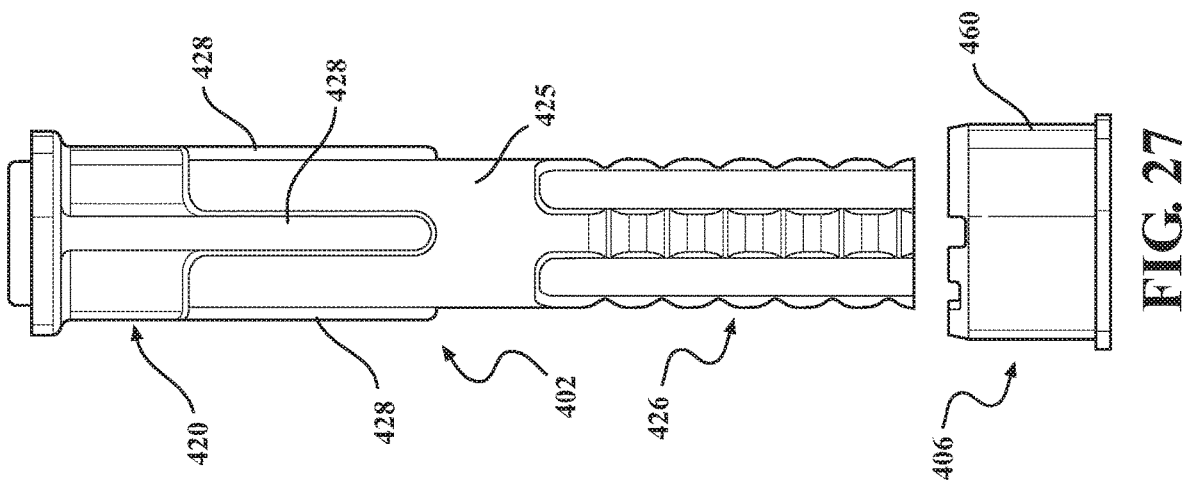
FIG. 27

FAUCET WITH INTEGRATED VALVE

CROSS-REFERENCE TO RELATED PATENT APPLICATIONS

This application claims priority to and the benefit of U.S. Provisional Patent Application No. 62/727,699, filed Sep. 6, 2018. U.S. Provisional Patent Application No. 62/727,699 is incorporated herein by reference in its entirety.

BACKGROUND

The present application relates generally to the field of faucets. More specifically, this application relates to faucets (e.g., kitchen faucets, bathroom faucets, etc.) having integrated valves that are easier to manufacture and assemble.

Current faucets are constructed mainly with components that are tailored to the specific faucet configuration and, therefore, there is minimal standardization of components across different faucet configurations. Further, current faucets typically are secured in place using a threaded ring attachment, which requires the installer to manually thread the ring (e.g., while lying on their back under the counter) up to the underside of the sink. The installation is not ergonomic and can take a relative long time due to the number of turns required to position the ring under the counter. Also, most faucets cannot be water tested until almost fully assembled, so if there is a leak during testing, it is a costly repair due to a lot of labor being lost in the assembly, disassembly, repair, and reassembly of the faucet. The faucets of this application sought to remedy the above deficiencies, as well as others.

SUMMARY OF THE INVENTION

At least one embodiment of the application relates to a faucet that includes an external body having a base and a spout extending from the base. The faucet includes a unitary valve structure having a cup disposed in the external body, and a tubular mount extending downwardly beyond the external body. The faucet also includes a valve supported in the cup of the valve structure, and a locking assembly that detachably locks to the mount of the valve structure.

At least one embodiment of the application relates to a method of making a valve connector for a faucet that includes rotating a central pivoting member and three outer pivoting members of a first die half to a first position, wherein the central pivoting member rotates about a pivot axis and each outer pivoting member rotates about a rotational axis that is parallel to the pivot axis and the other two rotational axes; closing a second die half to the first die half; injecting a material into the die halves to form the valve connector; and opening the die and rotating the central pivoting member about the pivot axis and three outer pivoting members about their associated rotational axis to a second position, which allows the valve connector to be removed from the die.

BRIEF DESCRIPTION OF THE DRAWINGS

FIG. 12 is an exploded perspective view of a locking assembly for securing a faucet in place.

FIG. 13 is a perspective view of the locking assembly shown in FIG. 14.

FIG. 14 is a side cross-sectional view of the locking assembly shown in FIG. 13.

FIG. 27 is a front exploded view of a valve structure and a base mount.

FIG. 28 is a front view of the base mount and the valve structure shown in FIG. 27 assembled together.

FIG. 29 is a perspective view of the base mount shown in FIGS. 27 and 28.

FIG. 30 is another perspective view of the base mount shown in FIGS. 27 and 28.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the Figures, disclosed herein are faucets that include integrated valves and structures for retaining the valves in the faucets. The faucets of this application solve numerous problems and provide numerous advantages, some of which include simplifying manufacturing (e.g., reducing part count; standardizing parts across multiple faucet configurations, such as between swing spout, pull-out, and pull-down faucets; allowing replacement of tight tolerance components with looser tolerance components; potential for automation of the waterway sub-assembly; etc.); simplifying installation and service (e.g., replacing the typical threaded attachment with a quarter turn attachment; reducing the clearance necessary between the sink and structure under the counter; eliminating the need for a torque wrench or the doubt about whether or not the nut is tight enough after service with a quarter turn valve nut; etc.); improving quality (e.g., providing a waterway sub-assembly, such as consisting of the supply hoses, valve and outlet hose, that can be assembled and water tested independent of the faucet configuration and/or the faucet product line; potential for automation of the waterway sub-assembly; etc.). The faucets disclosed herein solve such problems and provide such advantages by, for example, utilizing or providing one or more of a hydro formed faucet body with an integrated shank, since the hydroforming produces a strong part using less material; a quarter turn attachment nut that greatly speeds up installation and provides a lower profile (compared to prior attachments) that reduces the real estate needed under the sink; a wave spring for the quarter turn valve nut to obtain the desired compressive valve load; a valve puck, which facilitates manufacturing (e.g., molding) three hose barbed ports; a complete waterway sub-assembly that can be water tested independent of the faucet configuration; and/or a faucet structure that is modifiable to suit different size faucets (e.g., diameter, height, etc.) by modifying the upper and lower bearings, which can be configured as straight pull injection molded components.

Figure 1:
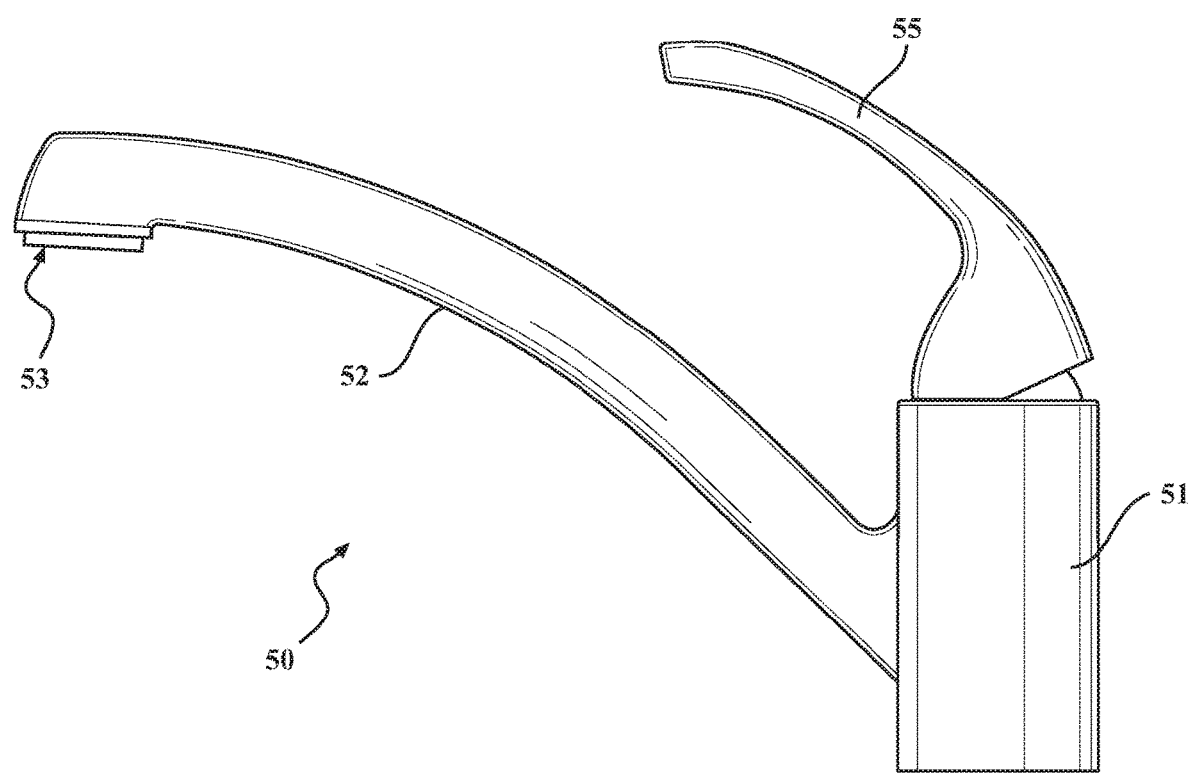
FIG. 1 is a side view a faucet having an integrated valve, according to this application.
Figure 2:
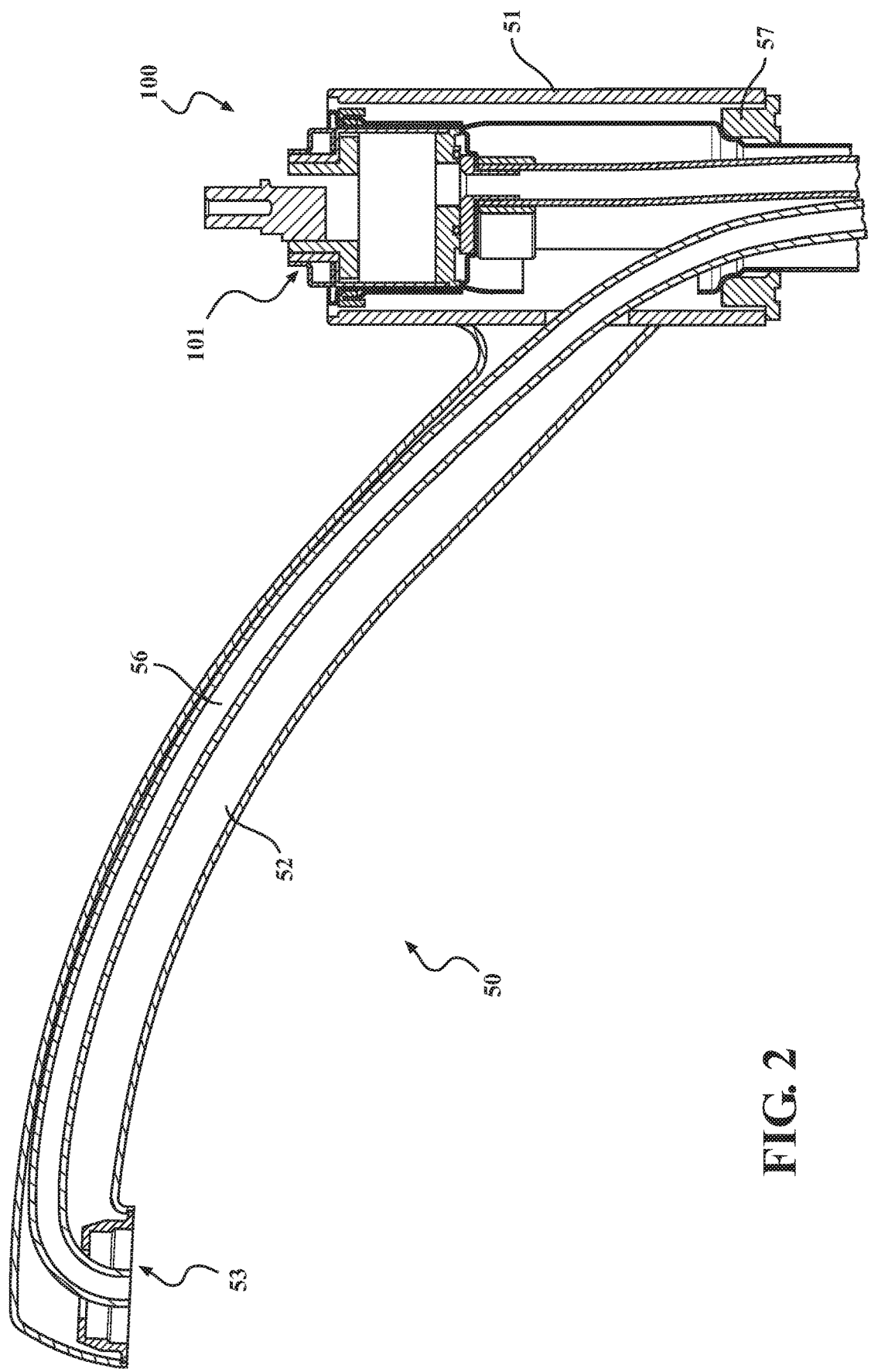
FIG. 2 is a cross-sectional side view of a faucet, like the faucet shown in FIG. 1.

FIGS. 1-6 disclose various examples of faucets 50, 60, 70 that include integrated valve assemblies, as disclosed herein, which include valves and valve structures. FIGS. 1 and 2 illustrate an exemplary embodiment of a faucet 50 that includes a rigid external body having a base 51 and a spout 52 extending away from the base 51. An outlet 53 is disposed in the spout 52 to dispense/emit water from the faucet 50. A handle 55 is moveably (e.g., adjustably) disposed on the top of the base 51 to control operation (e.g., functionality) of a valve 101 of a valve assembly 100 (e.g., top mount valve assembly), which controls water flow and/or temperature to the outlet 53. As shown in FIG. 2, the valve 101 is located in the base 51 of the faucet 50, and a fluid conduit 56 (e.g., hose, tube, etc.) fluidly connects the outlet 53 and a water source and/or the valve 101. The rigid external body of the faucet 50 is rotatable relative to a base mount 57, which can be fixedly secured to a support (e.g., sink, sink deck, countertop, etc.).

Figure 3:
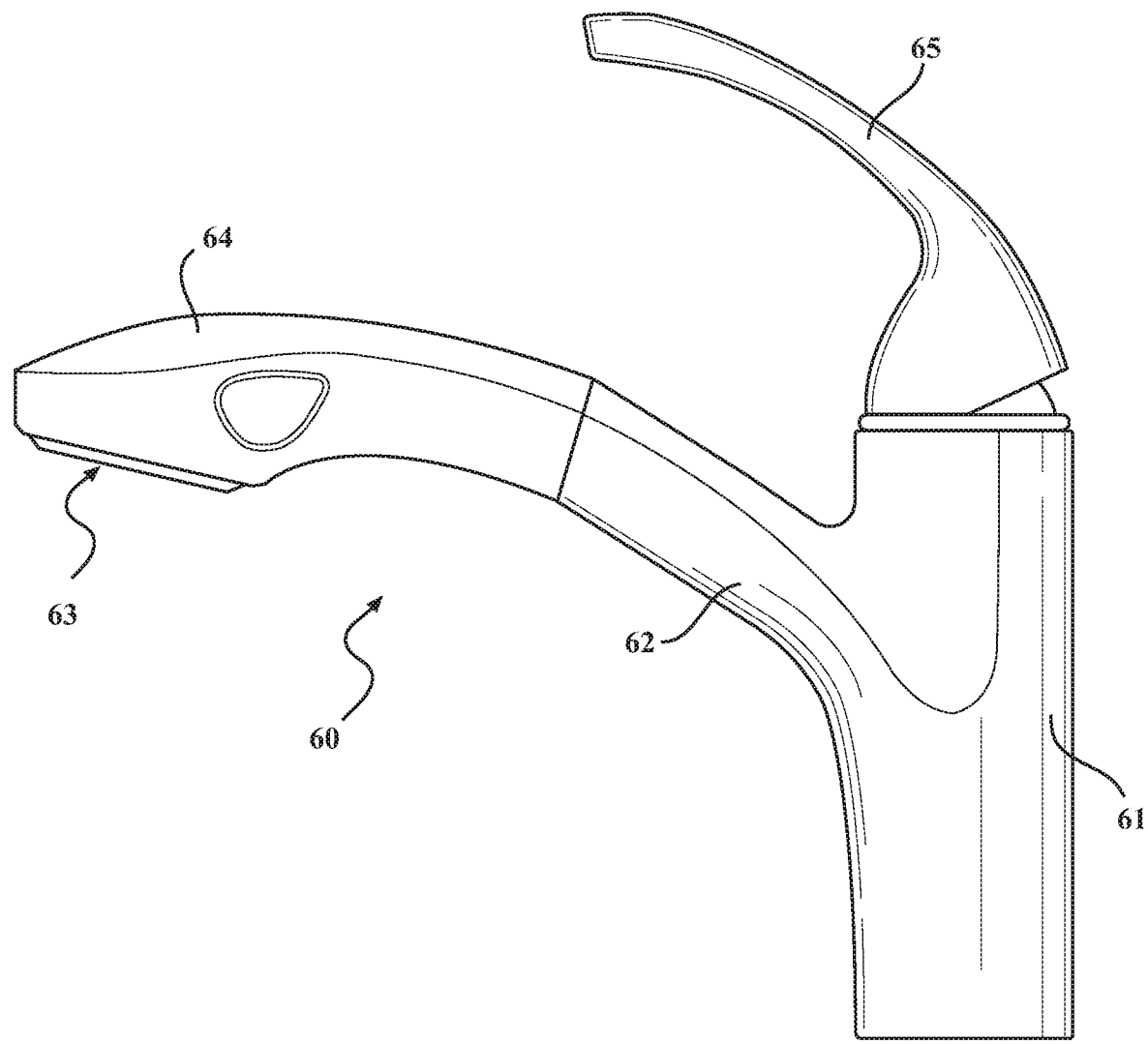
FIG. 3 is a side view a faucet having an integrated valve, according to this application.
Figure 4:
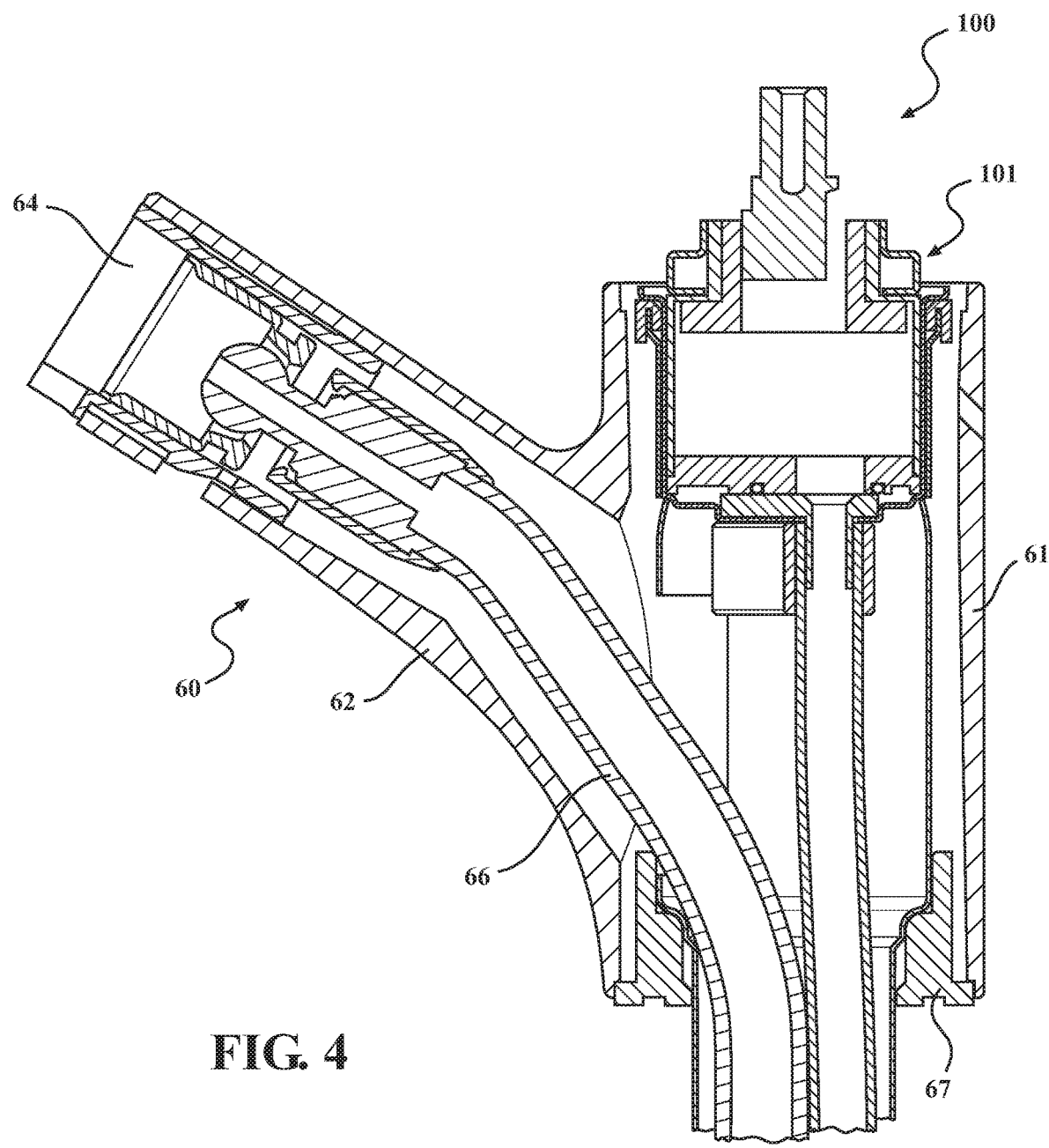
FIG. 4 is a cross-sectional side view of part of a faucet, like the faucet shown in FIG. 3.

FIGS. 3 and 4 illustrate an exemplary embodiment a faucet 60 that includes a rigid external body having a base 61 and a spout 62 extending away from the base 61. A water outlet 63 is disposed in a pull-out sprayer 64, which is detachably connected to the spout 62. A top mount handle 65 is adjustably (e.g., moveably) disposed on the top of the base 61 to control operation of the valve 101 of the valve assembly 100, which is located in the base 61. A flexible hose 66 fluidly connects the sprayer 64 and a water source and/or the valve 101. The rigid base 61 can be rotatable relative to a base mount 67, which is coupled to a support.

Figure 5:
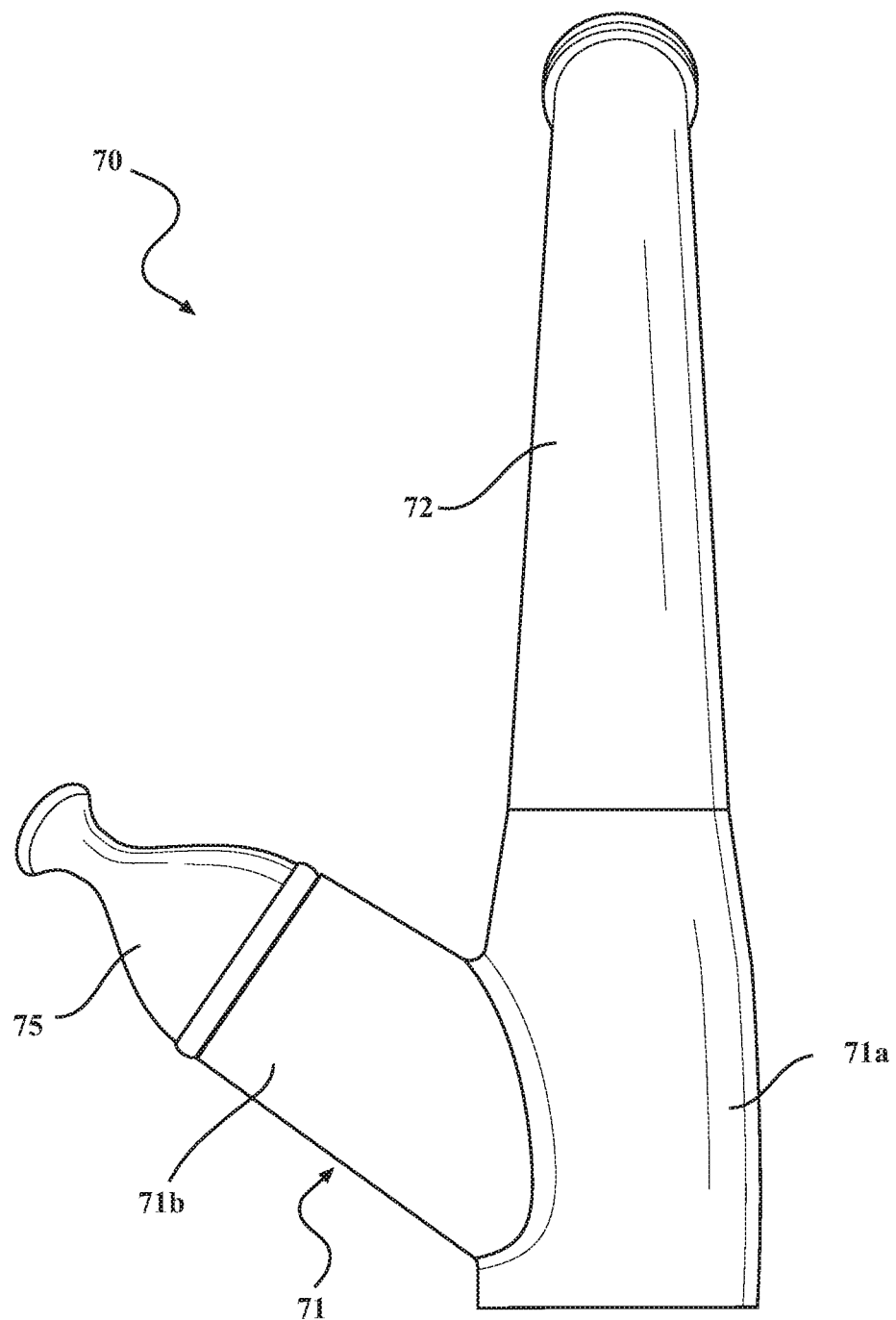
FIG. 5 is a rear view a faucet having an integrated valve, according to this application.
Figure 6:
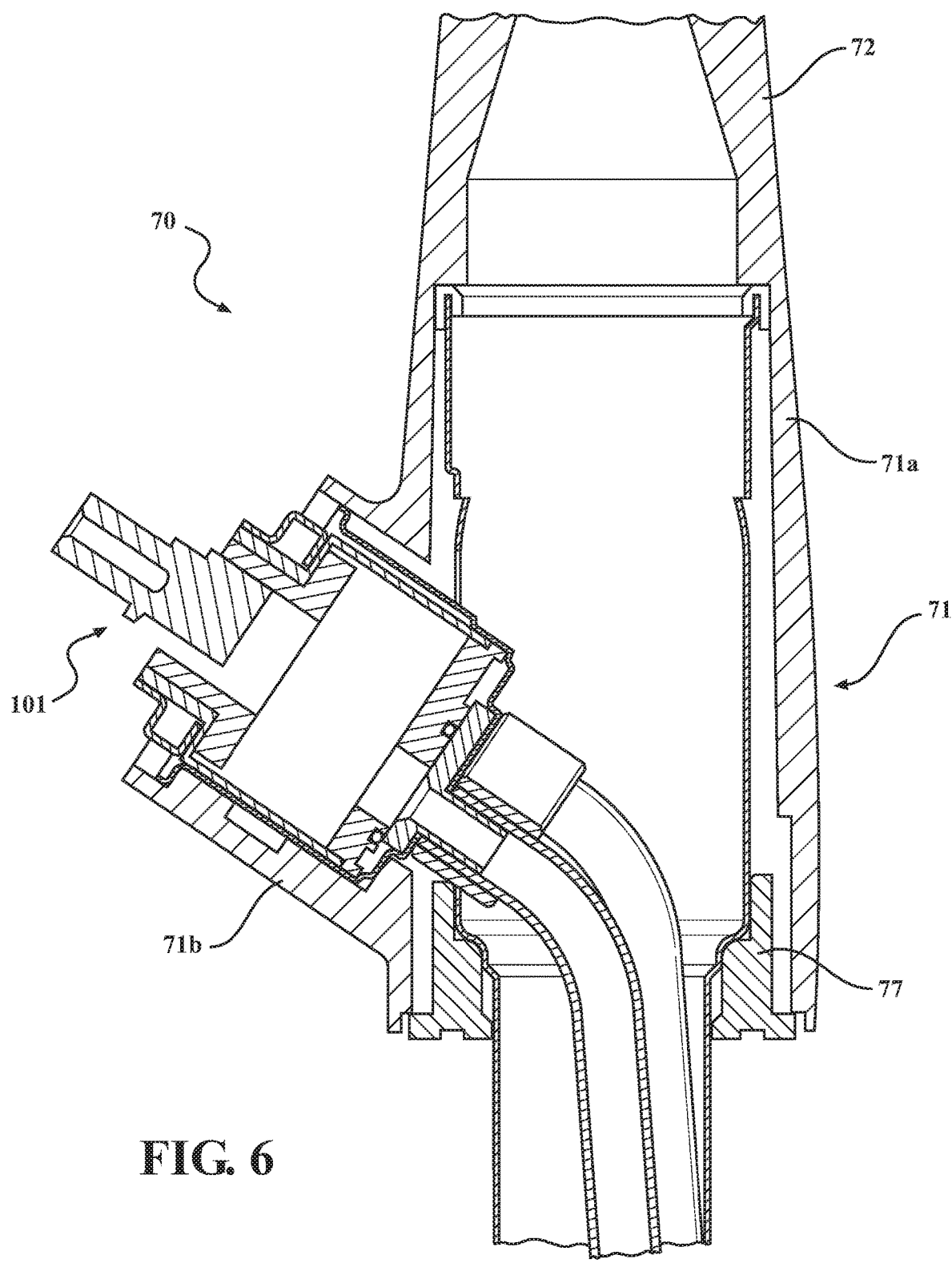
FIG. 6 is a cross-sectional rear view of part of a faucet, like the faucet shown in FIG. 5.

FIGS. 5 and 6 illustrate an exemplary embodiment of a faucet 70 that includes a base 71, which can be fixed mounted or configured to remain stationary, and a spout 72, which extends from and is rotatable about the base 71. The base 71 and the spout 72 form an external body for housing the valve assembly 100. The base 71 has a central part 71a that is rotatably mounted on a base mount 77 and rotatably supports the spout 72. The base 71 also has a side part 71b that extends from a side of the central part 71a. The side part 71b receives and supports a valve 101 and a handle 75 operatively coupled to the valve 101 to control operation of the valve 101. It is noted that the integrated valve assemblies of this application can be used in other types of top mount handle faucets than the faucets shown in FIGS. 1-4, other types of side mount handle faucets than the faucets shown in FIGS. 5 and 6, as well as other types of faucets, both kitchen and bath faucets.

Figure 7:
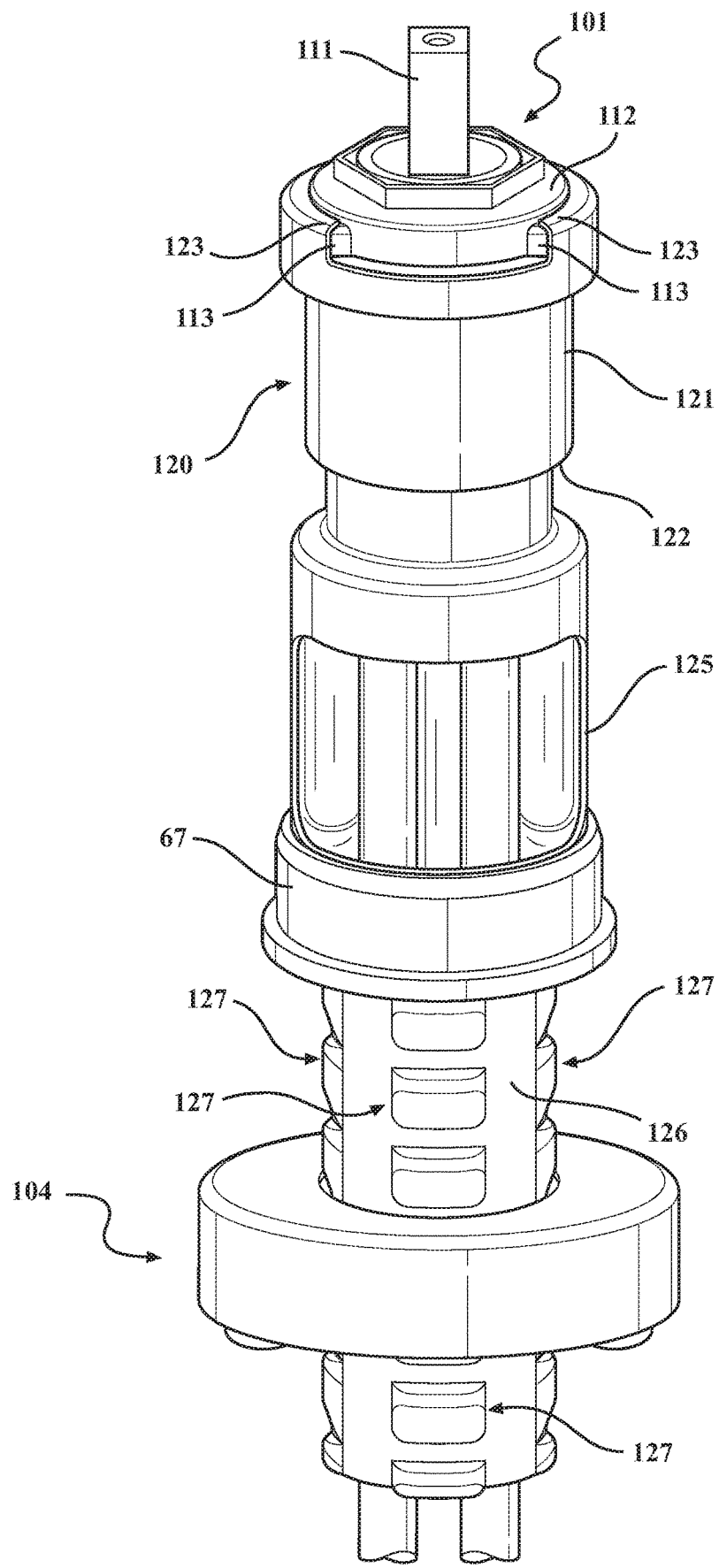
FIG. 7 is a perspective view of a valve retaining structure and a valve, according to this application.
Figure 8:
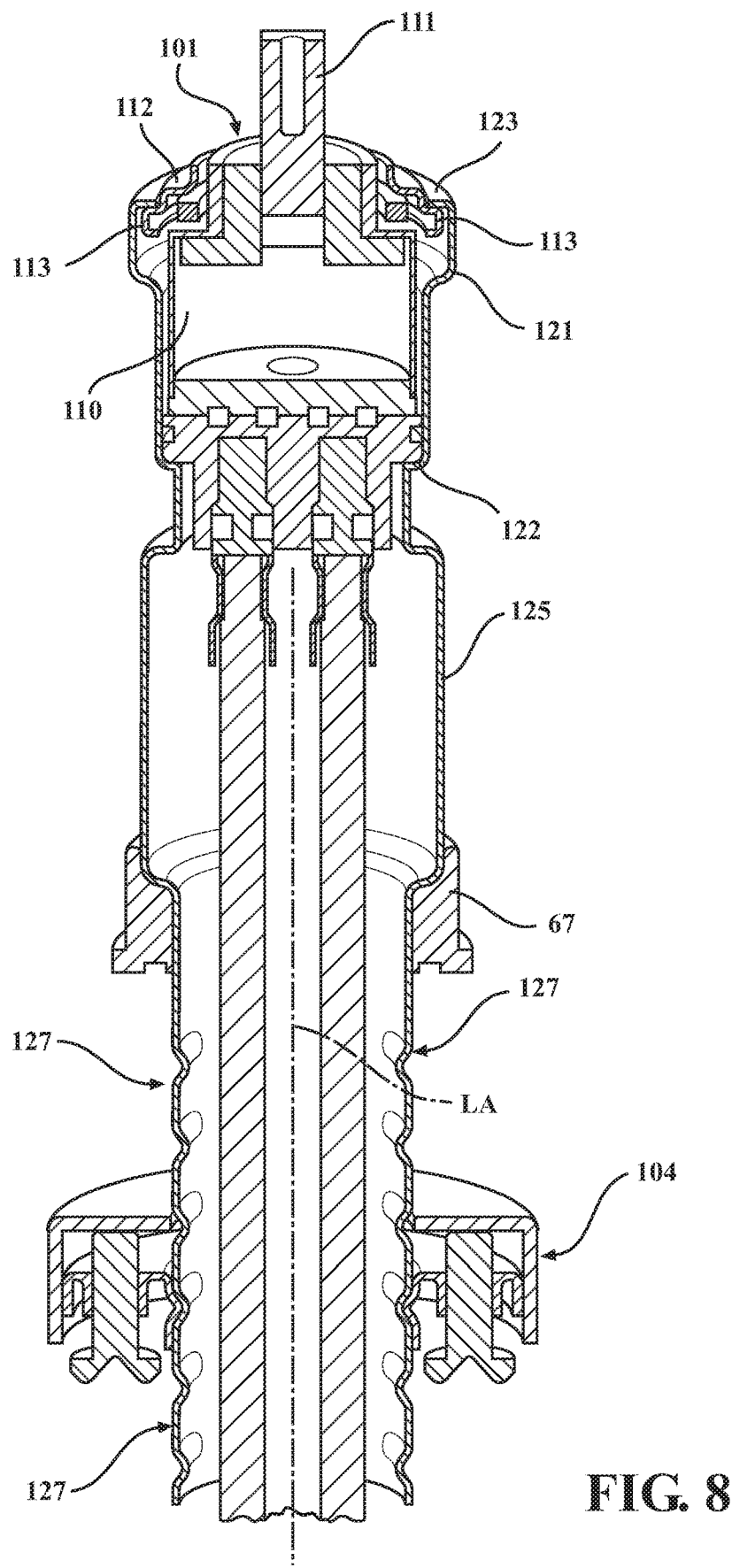
FIG. 8 is a cross-sectional view of the valve retaining structure and the valve shown in FIG. 7.
Figures 9, 10:
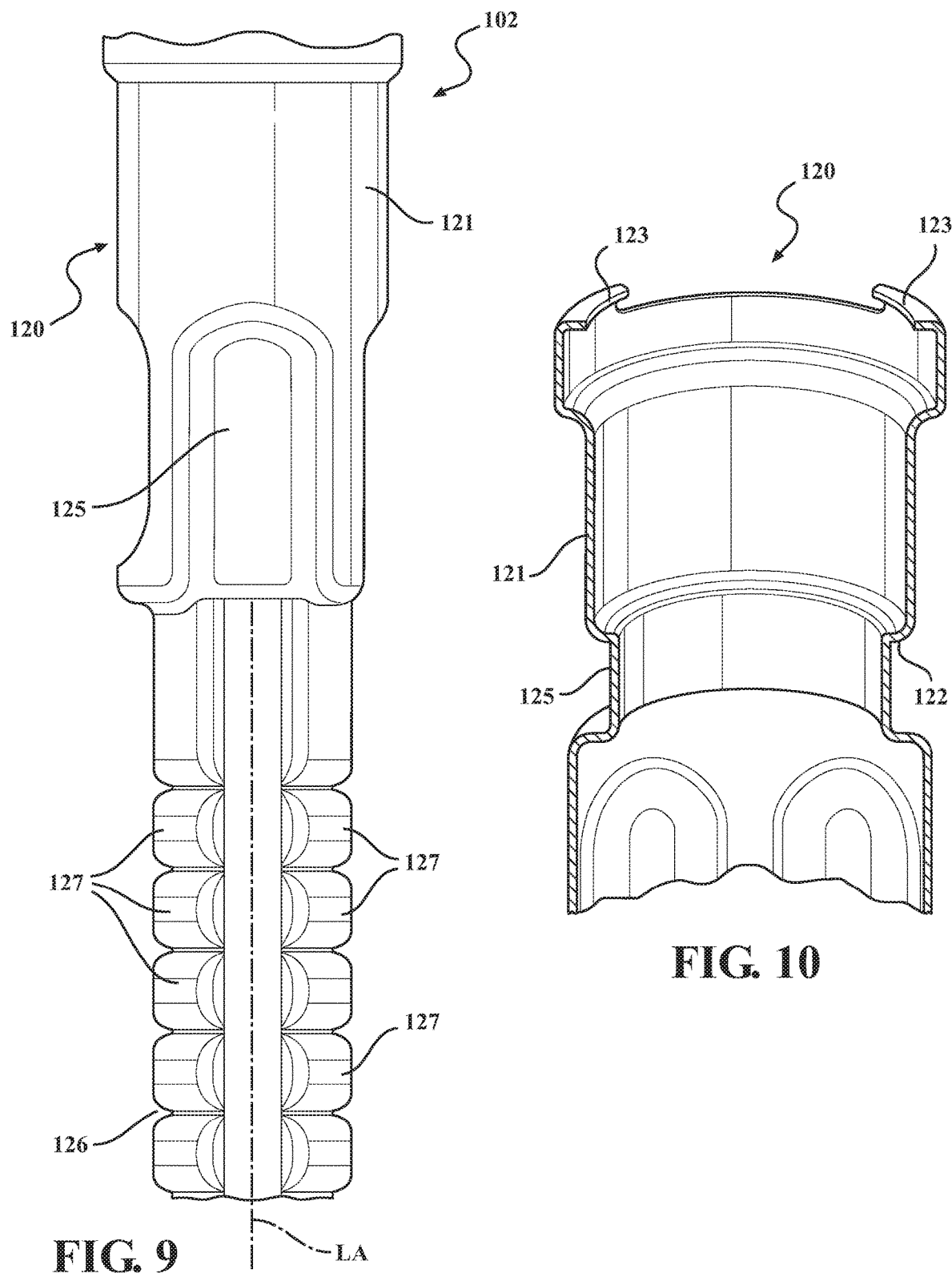
FIG. 9 is a perspective view of a valve retaining structure.
FIG. 10 is a cross-sectional perspective view of part of the valve retaining structure shown in FIG. 9.

FIGS. 7-9 illustrate an exemplary embodiment of a valve assembly 100 that includes a valve 101 and a one piece (e.g., unitary, integrally formed, etc.) valve structure 102 for supporting the valve 101. As shown in FIGS. 7-10, the valve structure 102 includes a cup 120 for receiving and retaining the valve 101, where the cup 120 has a sidewall 121, a bottom 122 at the lower end of the sidewall 121, and two tabs 123 disposed on opposite sides at the upper end of the sidewall 121. Each of the illustrated two tabs 123 is semi-annular and helical shaped (e.g., like threads) to retain one mating tab 113 of the valve 101 in a locking position, which is about a quarter turn (90°) from an install position. The helical shape of each tab 123 facilitates compression of the valve in the locking position. Extending downwardly from the bottom 122 is a support wall 125 that is supported by a shoulder of a base mount (e.g., the base mount 67). The support wall 125 can include an opening therein, such as to route other elements (e.g., fluid conduit, flexible hose, etc.) therethrough.

The valve structure 102 includes a mount 126 that extends downwardly from the support wall 125. The mount 126 is generally tubular and is configured to extend through the support (e.g., sink, sink deck, countertop, etc.) to which the faucet is mounted on. The mount 126 include a plurality of corrugations 127 that cooperate with a locking assembly 104 to secure the valve structure 102 in place relative to the support, as discussed below. As shown in FIGS. 7-9, the mount 126 includes four rows of corrugations 127 spaced apart circumferentially, where each row of corrugations 127 extends generally linearly in a longitudinal direction LA of the mount 126 and each pair of adjacent rows of corrugations 127 are separated by a smooth part (e.g., non-corrugated part) of the mount 126 that extends in the longitudinal direction LA. The corrugations 127 includes alternating raised and lowered surfaces, where the raised surfaces are outwardly offset from (e.g., radially, diametrically, etc.) from the smooth parts of the mount 126. The lowered surfaces of the corrugations 127 can be flush with or offset from the smooth parts of the mount 126, but are inwardly offset from the raised surfaces of the corrugations 127.

Figure 11:
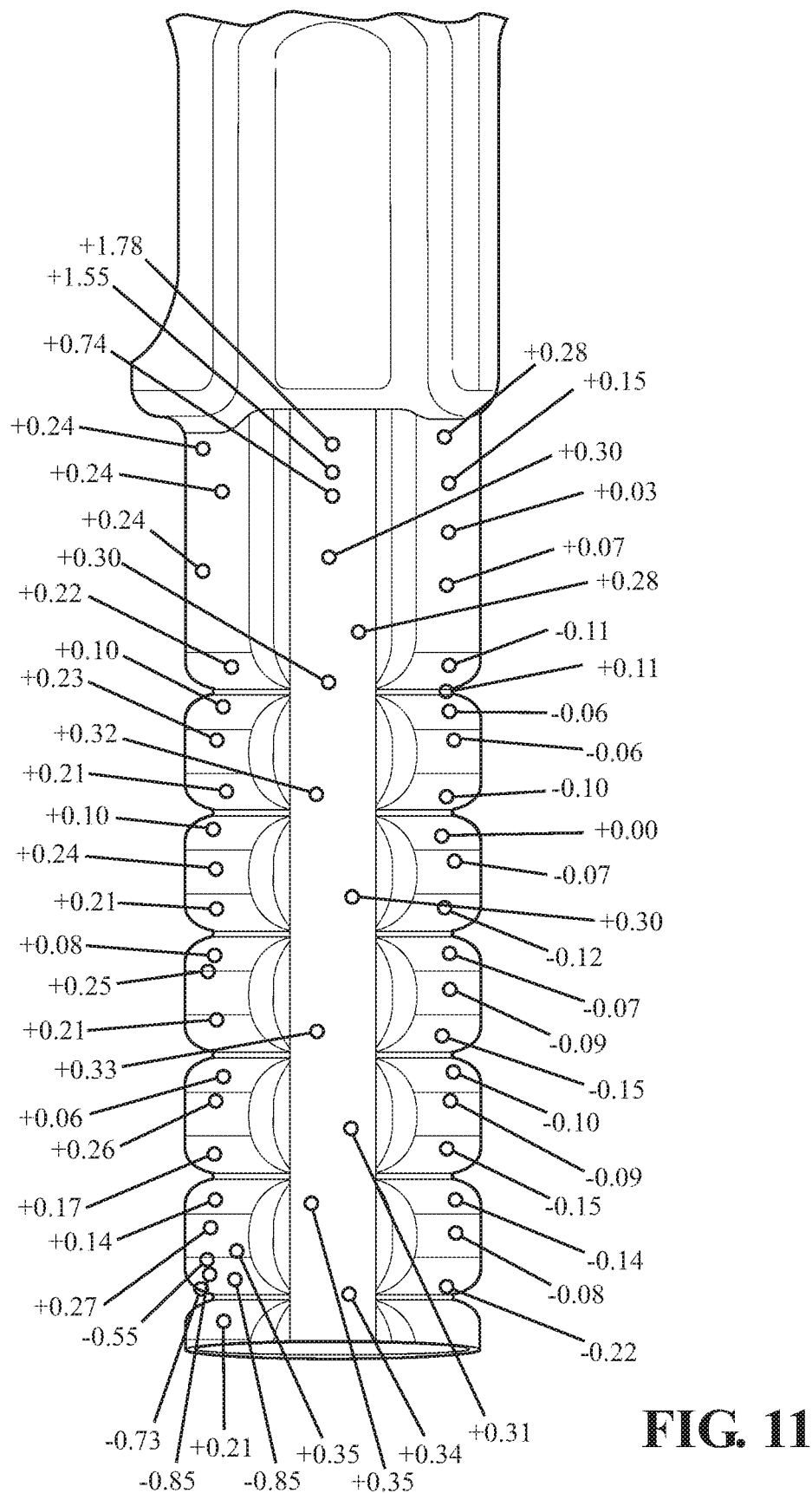
FIG. 11 is a computer modelling diagram showing forming analysis of the valve retaining structure.

Also shown in FIGS. 7-9, the cup 120, the support wall 125 and the mount 126 are integrally formed as a unitary, one-piece valve structure 102. According to an exemplary embodiment, the valve structure 102 is formed using a hydroforming process, which advantageously provides a strong part using minimal material and eliminates the need to couple separate elements together. FIG. 11 illustrates forming analysis of the valve structure 102 simulating a hydroforming process. The hydroformed unitary valve structure 102 advantageously replaces multiple parts that otherwise would be formed separately and coupled together, which would increase part cost and labor cost of assembly.

The valve 101 includes a cartridge 110 (e.g., cartridge valve) that fits in the cup 120 of the valve structure 102. A valve stem 111 extends from the cartridge 110 and is configured to couple to a handle to allow a user to control operation of the valve 101 with the handle. During assembly, the cartridge 110 is inserted into the cup 120 through the open top, then a valve lock 112 is inserted over the valve stem 111 with the two tabs 113 of the valve lock 112 out of alignment (e.g., misaligned in a non-locking position) with the tabs 123 of the valve structure 102, then the valve lock 112 is rotated about one quarter of a turn (ninety degrees) so that the tabs 113 of the valve lock 112 are aligned with the tabs 123 of the valve structure 102 to secure valve 101 in place in a locking position.

FIGS. 12-14 illustrate an exemplary embodiment of a locking assembly 104 (e.g., a nut assembly) that selectively couples to the valve structure 102 to secure a faucet (e.g., faucets 50, 60, 70) to the support. The illustrated locking assembly 104 includes a lock plate 140 (e.g., lock nut, etc.), a clamp plate 141, and two fasteners 142 for adjustably coupling the clamp plate 141 and lock plate 140 together. The lock clamp plate 141 includes a hollow outer wall 143, which is shown in FIG. 12 to have an elliptical cross-sectional shape, a top wall 144 having a central opening for receiving the mount 126, and a pair of tabs 145 extending inwardly from opposite sides of the bottom of the outer wall 143. As shown in FIG. 14, the tabs 145 and the top wall 144 retain the lock plate 140 within the outer wall 143.

The illustrated lock plate 140 includes an annular body 146 having a central opening that is sized to receive the mount 126. As shown in FIGS. 12 and 14, disposed around an inside (e.g., an inner wall) of the body 146 are four inwardly extending projections 147 that are configured to slide along the smooth parts of the mount 126 in a non-locking position and engage the corrugations 127 in a locking position. Thus, the depth of each projection 147 is tailored to engage the corrugations 127, while clearing the smooth parts of the mount 126. The illustrated body 146 includes two threaded holes 148, one hole 148 for receiving each of the two fasteners 142.

During installation, the mount 126 extends through the support (e.g., a hole therein) such that the base mount (e.g., the base mount 67) rests on a top side of the support and the mount 126 extends beyond an underside of the support. The lock plate 140 is disposed within the clamp plate 141 and each fastener 142 is threaded to one of the threaded holes 148 of the lock plate 140. The locking assembly 104 is slid along the longitudinal axis LA over the mount 126 with the projections 147 aligned with the smooth parts of the mount 126 until the locking assembly 104 is in place relative to the support, such as, for example with the top wall 144 of the clamp plate 141 proximate to (e.g., adjacent to, abutting, etc.) the underside of the support. Then the locking assembly 104 is rotated one quarter of a turn (e.g., about ninety degrees) so that the projections 147 of the lock plate 140 engage the lowered surfaces between two adjacent raised surfaces of the corrugations 127 of the mount 126. The two screws 142 can be rotated in a locking direction (e.g., clockwise) to tighten the locking assembly 104 to the support. Each screw 142 has a threaded shank that threads to an associated threaded hole 148 in the lock plate. Once the end of the screw 142 contacts an underside of the top wall 144 of the clamp plate 141, continued rotation of the screw 142 moves the top wall 144 away from the lock plate 140 (i.e., moves the clamp plate 141 relative to the lock plate 140). Once the top wall 144 contacts the underside of the support, continue rotation of the screws 142 moves the lock plate 140 relative to the clamp plate 141 until a portion of the body 146 engages the tabs 145 of the clamp plate 141. Thus, the locking assembly 104 advantageously provides for quick installation since the locking assembly 104 can be slid over the mount 126 then held tight by a quarter turn of the locking assembly 104. At this point, the faucet is retained without a user having to hold the faucet in place. The faucet can be fully secured by adjusting the locking assembly 104, as described above.

Figure 15:
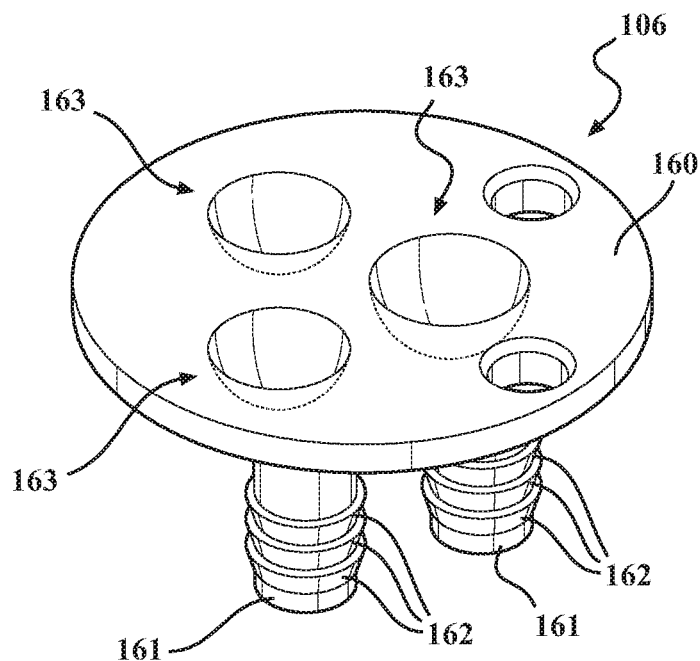
FIG. 15 is a top perspective view of a valve connector.
Figure 16:
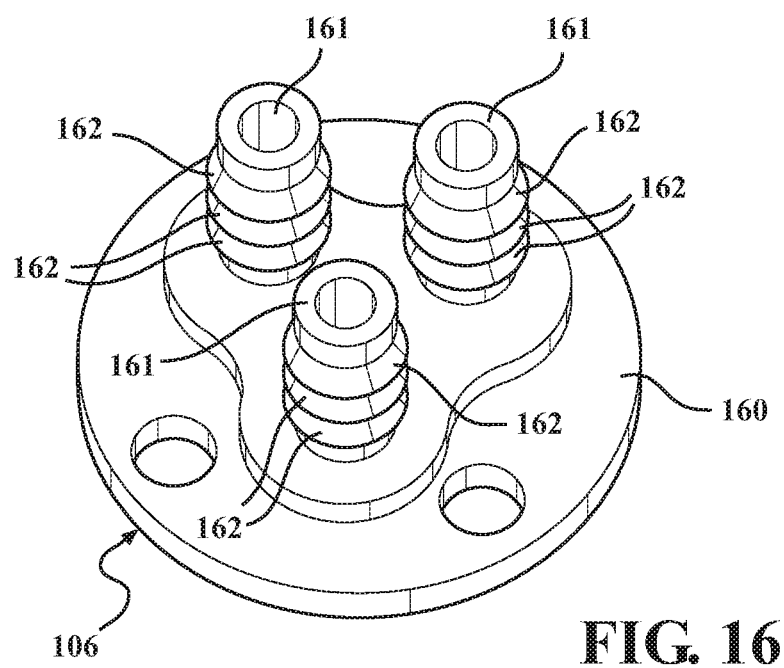
FIG. 16 is a bottom perspective view of the valve connector shown in FIG. 15.

FIGS. 15 and 16 illustrate an exemplary embodiment of a valve connector 106 (e.g., a valve puck) that fluidly connects a valve (e.g., the valve 101) to a fluid source and/or an outlet. The illustrated valve connector 106 includes a cylindrical base 160 and three tubular extensions 161 extending away from a bottom of the base 160. Each extension 161 includes a plurality of barbs 162 on the outside to retain a fluid conduit (e.g., hose, tube, etc.) coupled to the extension 161. As shown, the barbs 162 are annular ribs extending around the circumference of the extension 161. However, the barbs 162 can have other configurations to help retain a fluid conduit to the extension 161. An opening 163 is disposed in the base 160 for each extension 161 to fluidly connect the extension with valve 101. It is noted that the three extensions can include a hot water inlet, a cold water inlet, and a mixed water outlet. The inlets/outlet can have the same size or different sizes.

Figure 17:
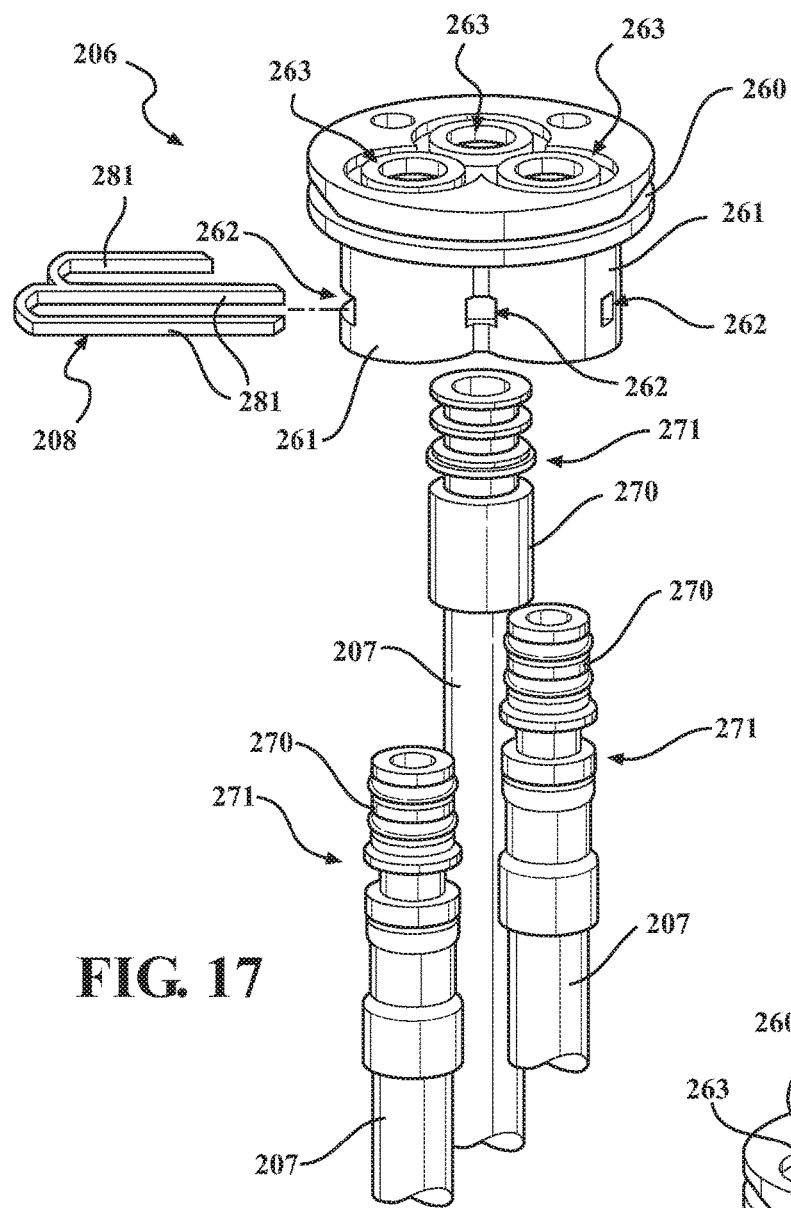
FIG. 17 is a perspective exploded view of a valve connector.
Figure 18:
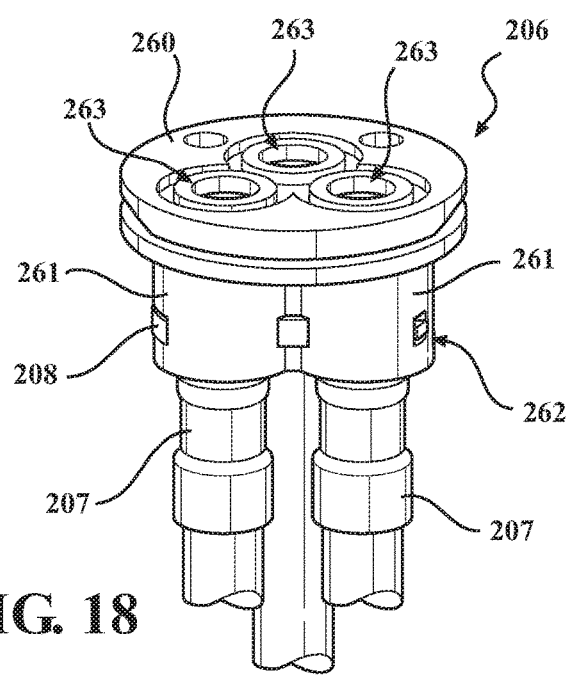
FIG. 18 is a perspective view of the valve connector shown in FIG. 17.

FIGS. 17 and 18 illustrate an exemplary embodiment of a valve connector 206 that fluidly connects a valve (e.g., the valve 101) to a fluid source and/or an outlet through three fluid conduits 207. The illustrated valve connector 206 includes a cylindrical base 260 with three extensions 261 extending from a bottom of the base 260. Each extension 261 includes a wall having a cylindrical bore for receiving an end 270 of one fluid conduit 207. A slot 262 extends through the wall of each extension 261 to receive a clip 208 to secure the ends 270 to the valve connector 206. As shown in FIG. 17, the clip 208 includes three prongs 281 extending generally parallel to one another, where each prong 281 engages a recess 271 (e.g., channel) in an end 270 of one fluid conduit 207 to retain that fluid conduit 207 in the associated bore of the associated extension 261. As shown in FIGS. 17 and 18, once the ends 270 of the fluid conduits 207 are in their associated bores of their associated extensions 261, the clip 208 is slid into engagement with the valve connector 206 by inserting the prongs 281 into the slots 262 and into the recesses 271 of the ends 270 to retain the end 270 of each of the fluid conduits 207 in the associated bore of the extensions 261 of the valve connector 206. An opening 263 is disposed in the base 260 for each extension 261 to fluidly connect the bore in the extension 261 with valve.

Figure 19:
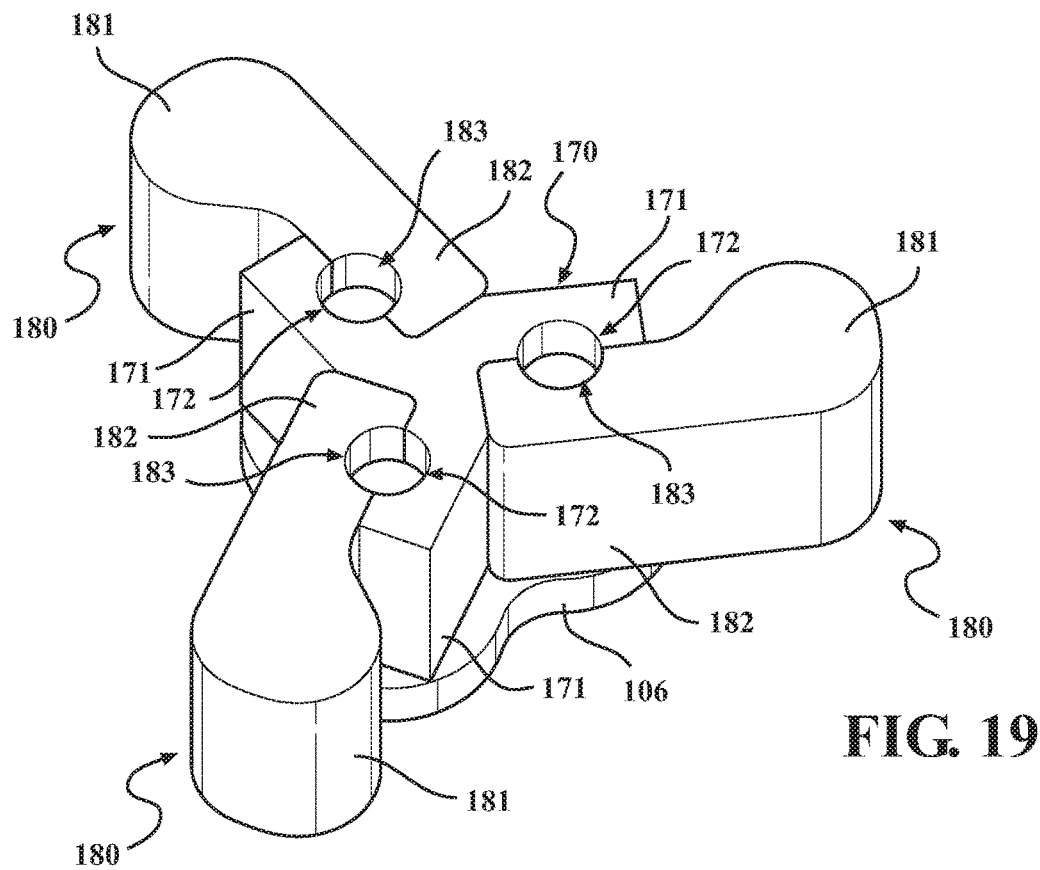
FIG. 19 is a perspective view of a valve puck in a first position.
Figure 20:
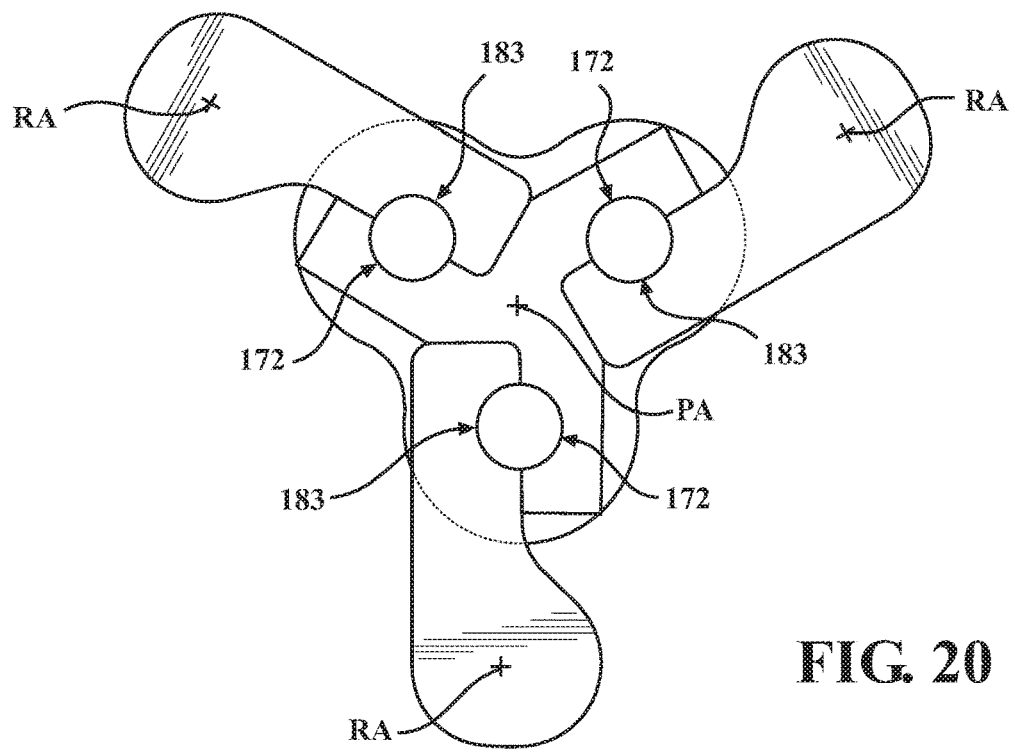
FIG. 20 is a top view of the valve puck shown in FIG. 19.
Figure 21:
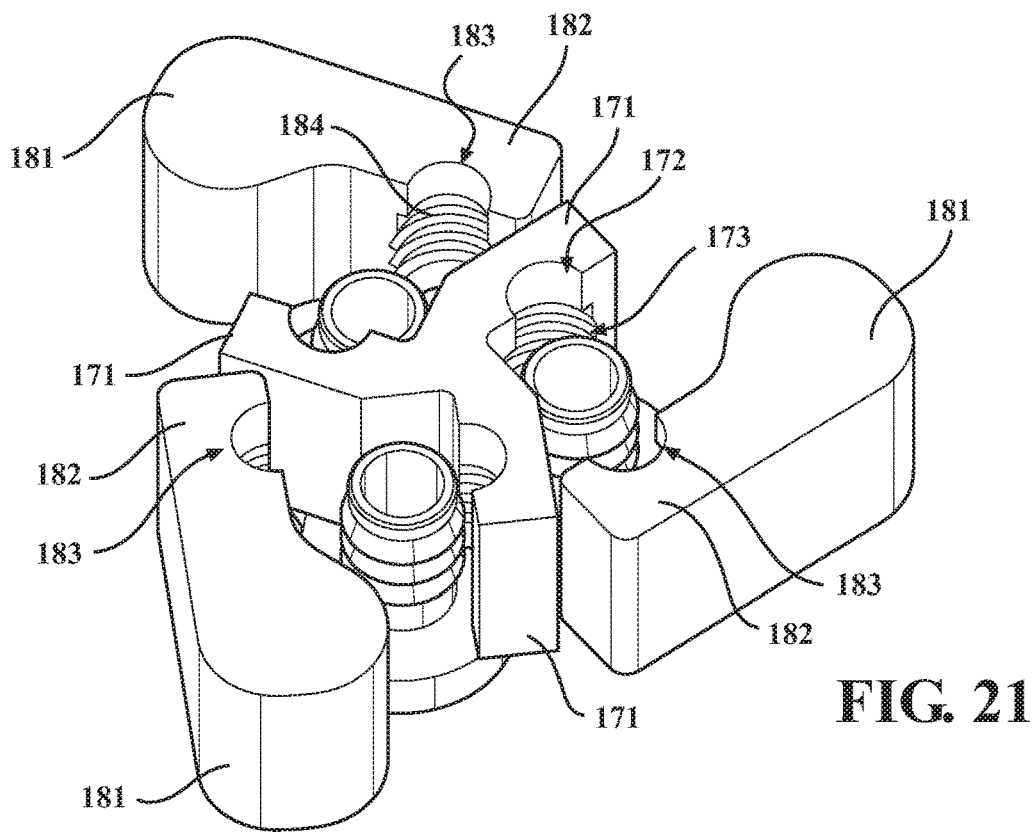
FIG. 21 is a perspective view of the valve puck shown in FIG. 19 in a second position.
Figure 22:
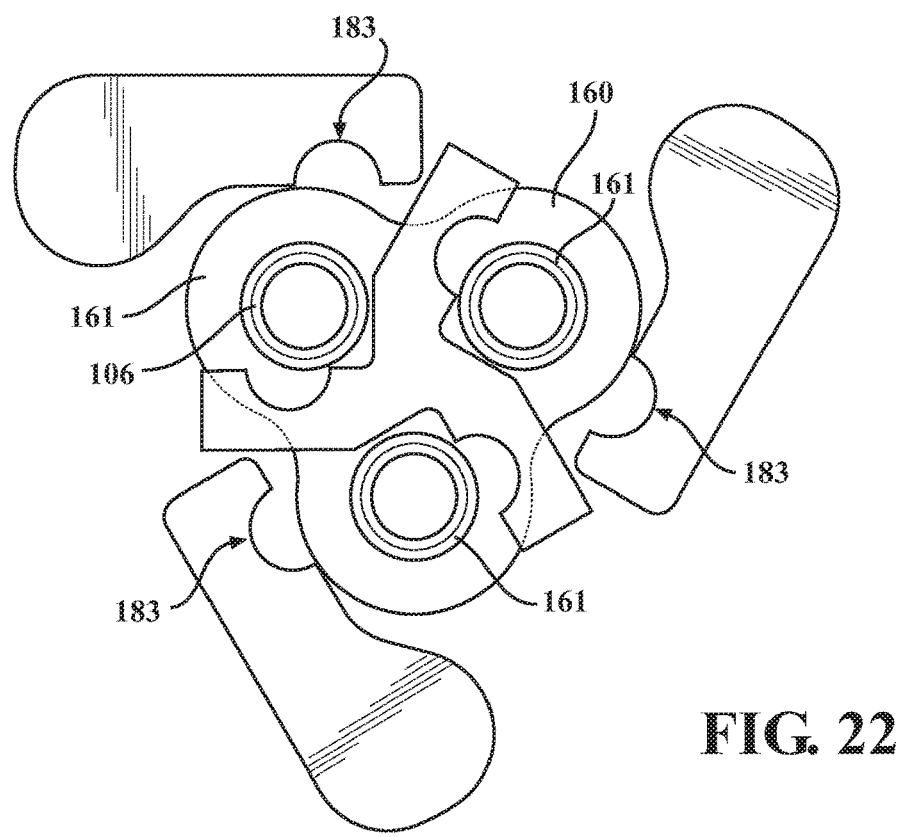
FIG. 22 is a top view of the valve puck shown in FIG. 21.

FIGS. 19-22 illustrate an exemplary embodiment of a method/process of making a valve connector (e.g., valve puck), such as, for example, the valve connector 106 shown in FIGS. 15 and 16. Conventional molding techniques have limited forming a valve connector having three or more extensions from a base without adding significant cost or limiting function. The process disclosed in FIGS. 19-22 provides a valve connector, such as the valve connector 106, and overcomes the deficiencies of conventional techniques. The process includes a central pivoting member 170 and three outer pivoting members 180 rotatably set in a first die half. The pivoting members 170, 180 rotate between a first (e.g., molding) position, which is shown in FIGS. 19 and 20, and a second (e.g., release) position, which is shown in FIGS. 21 and 22. The central pivoting member 170 includes three legs 171 extending from a central part, which includes the pivot axis PA about which the central pivoting member 170 rotates. Each leg 171 includes a generally semi-cylindrical notch 172 and one or more generally semi-annular recesses 173. Each outer pivoting member 180 includes a pivot end 181 having a rotational axis RA and a distal end 182. A generally semi-cylindrical notch 183 is disposed in each distal end 182 along with one or more generally semi-annular recesses 184. In the first position, one semi-cylindrical notch 172 cooperates with one semi-cylindrical notch 183 to form one extension 161 of the valve connector 106, and the recess(es) 173 cooperate with the recess(es) 184 to form the barbs 162. It is noted that current molding practices will not permit the mold(ing) of this part. Current injection mold tools with a planar (or even a stepped) parting surface cannot form the complete perimeter (diametrical surface) of each extension 161. Each extension 161 would have to spread further apart such that tool steel could completely encompass the extension 161 and then separate in a linear fashion. Current processes result in a die lock situation (i.e., where the tool halves cannot be separated).

An exemplary process of molding the valve connector 106 involves three steps. The first step involves rotating the central pivoting member 170 and three outer pivoting members 180 of the first die half to the first position, as shown in FIGS. 19 and 20, then closing a second die half to the first die half. The base 160 of the valve connector 106 is formed in a second die half. The second step involves injecting a material (e.g., plastic, polymer, die-cast material, etc.) into the die halves to form the valve connector 106. The third step involves opening the die (e.g., moving one die half away from the other die half) and rotating the central pivoting member 170 and three outer pivoting members 180 of the first die half to the second position, as shown in FIGS. 21 and 22, so that the part (the valve connector 106) can be removed from the die.

Figure 23:
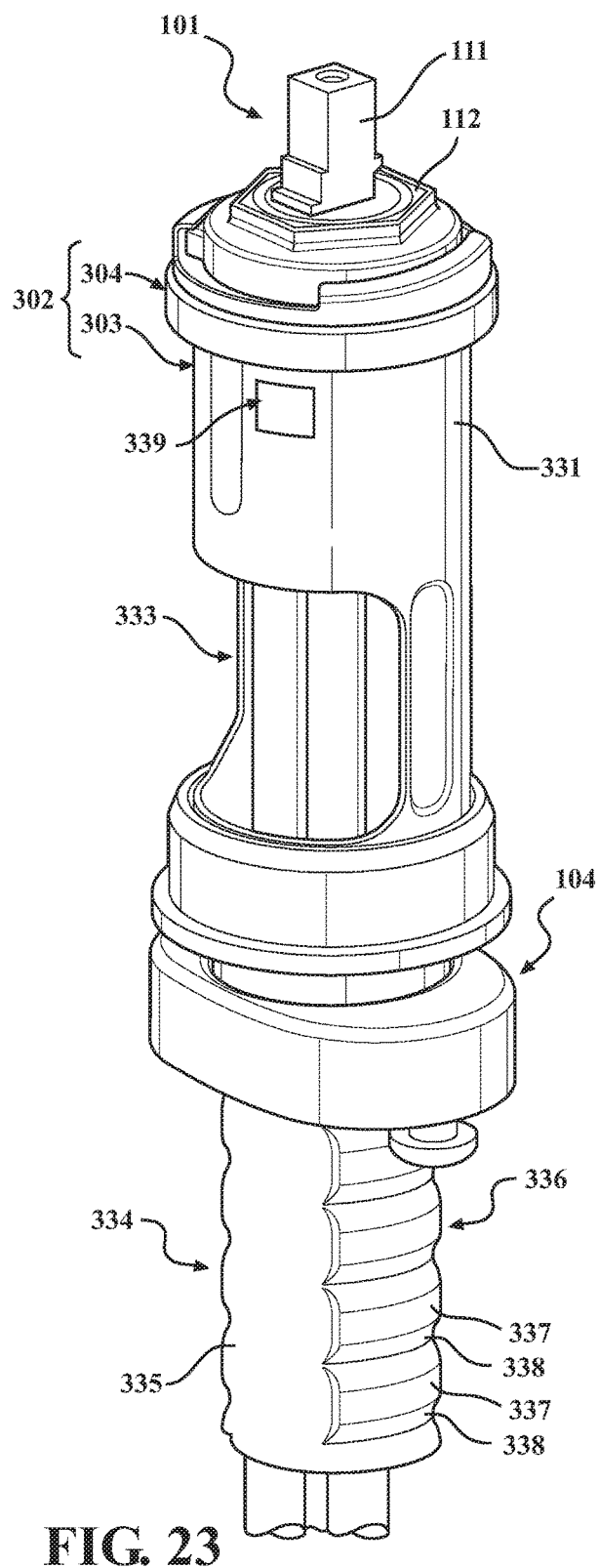
FIG. 23 is a perspective view of a valve retaining structure and a valve.
Figure 24:
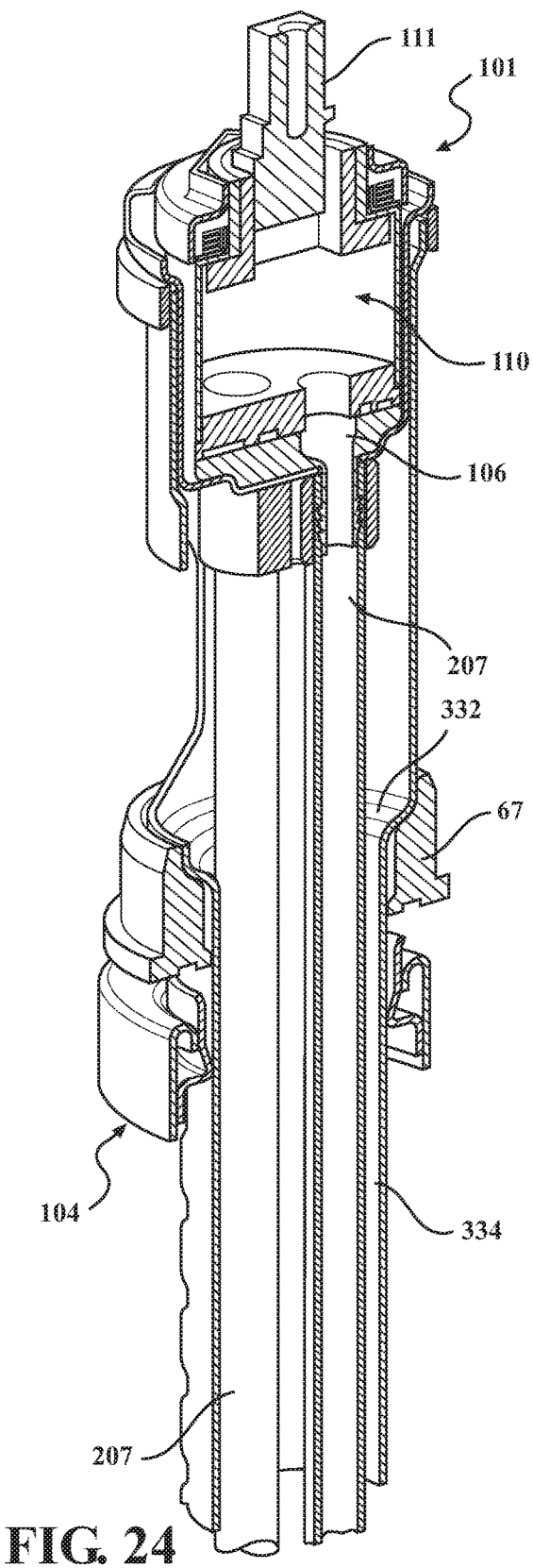
FIG. 24 is a cross-sectional view of the valve retaining structure and the valve shown in FIG. 23.

FIGS. 23 and 24 illustrate an exemplary embodiment of a valve assembly 300 that includes a valve 101 and a valve structure 302 for supporting the valve 101. The valve structure 302 includes a body 303 (e.g., valve body) and a cup 304 (e.g., valve cup). The body 303 includes a sidewall 331 that extends downwardly to a support wall 332, which is supported by a shoulder (e.g., an inner shoulder) of a base mount (e.g., the base mount 67) during installation. The sidewall 331 includes an opening 333 therein, such as to route other elements (e.g., fluid conduit, flexible hose, etc.) therethrough, such as the elements shown in FIGS. 2 and 4. The body 303 includes a mounting portion 334 (e.g., fixing portion, mount, etc.) that cooperates with a locking assembly (e.g., the locking assembly 104) to secure the valve structure 302 (and faucet) to a support. As shown in FIGS. 23 and 24, the mounting portion 334 includes two semi-circular sides 335 that are smooth (e.g., non-transitioning, non-corrugated) and two corrugated sides 336 in an alternating manner. Each corrugated side 336 includes alternating raised portions 337 and lowered portions 338. The locking assembly 104 shown in FIGS. 23 and 24 can be configured basically the same as that described above, except the number of projections 147 of the lock plate 140 is tailored to the number of corrugated sides 336, which in this instance is two.

Figure 26:
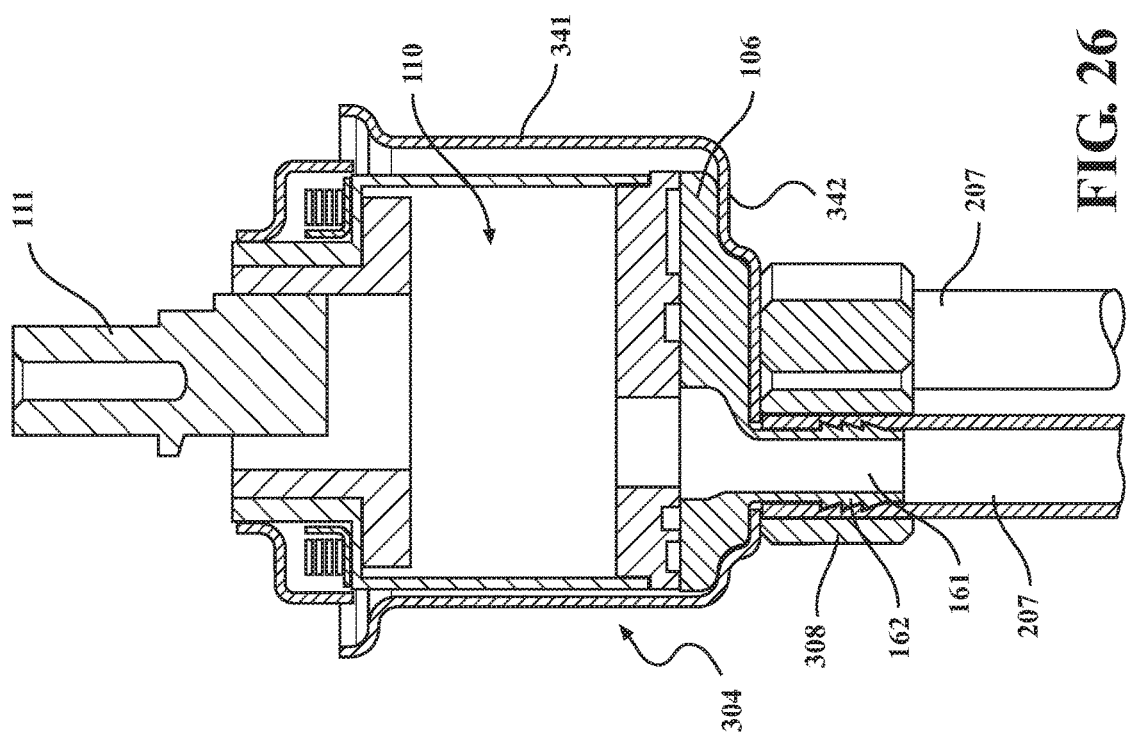
FIG. 26 is a front cross-sectional view of the valve assembly shown in FIG. 25.
Figure 25:
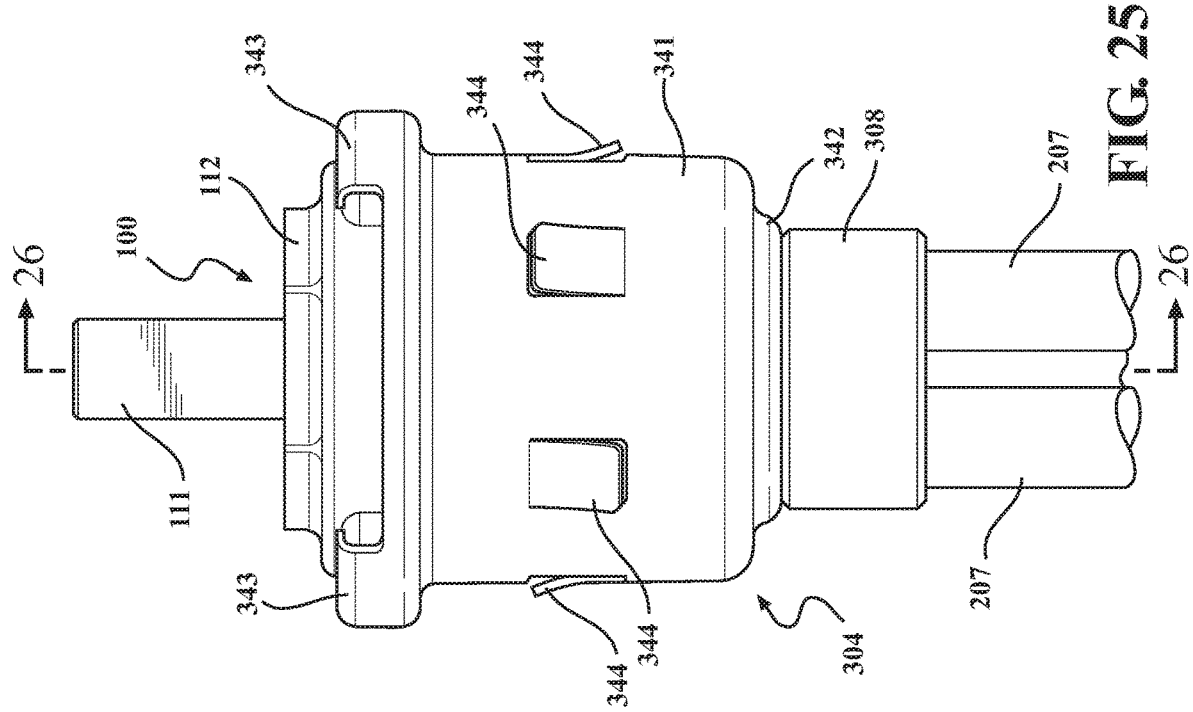
FIG. 25 is a front view of a valve assembly of a faucet.

As shown best in FIGS. 25 and 26, the cup 304, which is shown formed separately from the body 303, includes a sidewall 341, a bottom 342 at the lower end of the sidewall 341, and two flanges 343 disposed on opposite sides at the upper end of the sidewall 341. As shown in FIGS. 23 and 25, the sidewall 341 includes one or more lanced tabs 344 extending out from the sidewall 341 to engage an associated feature (e.g., one aperture 339) in the body 303. Each lanced tab 344 has three sides that are separated from the sidewall 341 and one side that remains connected to the sidewall 341 allowing the tab 344 to bend about the connected side so that the tab 344 is no longer flush with the sidewall 341. Each flange 343 is semi-annular (e.g., around a portion of the outer diameter of the sidewall 341) and extends back inward (e.g., radially inward) to retain a mating tab 113 of the valve lock 112 in a locking position, which can be about a quarter turn (90°) from an install position.

FIGS. 25 and 26 illustrate the valve cartridge 110 located in the cup 304. The valve connector 106 (FIG. 26) is provided below the valve cartridge 110 and is supported by the bottom 342 of the cup 304 to fluidly connect the fluid conduits 207 to the valve cartridge 110. Each fluid conduit 207 slides over an associated extension 161 of the valve connector 106 and the barbs 162 disposed on the extension 161. Optionally, a fixing nut 308 can be coupled over one or more of the fluid conduits 207 to retain each fluid conduit 207 to its respective or associated extension 161.

FIGS. 27-30 illustrate a valve structure 402 and a base mount 406 that are modular for use with various faucets having different heights. As discussed below in more detail, the base mount 406 can be assembled to the valve structure 402 in different configurations to change the relative height from the bottom of the base mount 406, which is configured to rest on a support to which the faucet is mounted to, to a top of a cup 420 of the valve structure 402. Thus, the same valve structure 402 and the same base mount 406 can be used in various faucets having different heights to control/influence the height of certain aspects/features of the faucets.

As shown in FIGS. 27 and 28, the valve structure 402 includes the cup 420, a support wall 425 located below the cup 420, and a mount 426 located below the support wall 425. These elements can be configured basically the same as the other cups, support walls, and mounts disclosed above, except where noted otherwise. The valve structure 402 also includes one or more locating fingers 428 (e.g., tenons, embosses, etc.), where each finger 428 extends longitudinally along and radially outward from the support wall 425. Each finger 428 defines a predetermined height from the bottom of the finger 428 to the top of the cup 420.

As shown in FIGS. 29 and 30, the base mount 406 includes an annular body 460 having an inside and an outside. Disposed along the inside at different circumferential locations are several notches, including a first notch 461, a second notch 462, and a third notch 463. Each notch 461, 462, 463 is configured as a recess in the inside of the body 460 that has a different longitudinal depth relative to the other notches, and each depth provides a different height of the valve structure 402 (and faucet) when coupled to the base mount 406. Thus, the illustrated first notch 461 has a first depth, which corresponds to a short height of the valve structure 402; the illustrated second notch 462 has a second depth, which corresponds to a medium height of the valve structure 402; and the illustrated third notch 463 has a third depth, which corresponds to a tall height of the valve structure 402. That is, the third depth is shorter than the second depth, which is shorter than the first depth. During assembly/installation, to achieve a tall height valve structure 402, each finger 428 of the valve structure 402 is aligned with the third notch 463 and the end that defines the third notch 463 supports the end of the finger 428 to fix the height of the valve structure 402. To achieve a medium height valve structure 402, each finger 428 of the valve structure 402 is aligned with the second notch 462 and the end that defines the second notch 462 supports the end of the finger 428 to fix the height of the valve structure 402. To achieve a short valve structure 402, each finger 428 of the valve structure 402 is aligned with the first notch 461 and the end that defines the first notch 461 supports the end of the finger 428 to fix the height of the valve structure 402. Thus, the height of the valve structure 402 can influence/determine the height of the faucet as well, so the same valve structure 402 and same base mount 406 can be employed with different faucets having different heights.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the faucets and faucet valves, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., faucet body, cup, valve, locking assembly, valve connector, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A faucet comprising:
   an external body having a base and a spout extending from the base;
   a valve structure comprising:
   a cup disposed in the external body; and
   a mount having a tubular shape and extending downwardly beyond the external body;
   a valve cartridge supported in the cup of the valve structure; and
   a locking assembly that detachably locks to the mount of the valve structure;
   wherein the mount comprises a first plurality of corrugations that are aligned in a first row in a longitudinal direction, and wherein the first plurality of corrugations cooperate with the locking assembly in a first rotational position to secure the valve structure in place relative to a support; and
   wherein the plurality of corrugations are aligned such that the locking assembly is slidable along an entire length of the first plurality of corrugations of the mount in a second rotational position.

2. The faucet of claim 1, wherein the mount includes a second plurality of corrugations spaced apart circumferentially from the first plurality of corrugations, the second plurality of corrugations are aligned in a second row in the longitudinal direction, and the second plurality of corrugations cooperate with the locking assembly to secure the valve structure in place.

3. The faucet of claim 2, wherein the mount includes a first smooth section and a second smooth section that are separated from one another and separate the first row and the second row.

4. The faucet of claim 3, wherein the locking assembly includes a lock plate comprising an annular body with a central opening that receives the mount.

5. The faucet of claim 4, wherein the lock plate locks with the mount in the first position and unlocks from the mount in the second position, and wherein the first position is a quarter turn from the second position.

6. The faucet of claim 1, wherein the valve structure is unitary and the cup is integral with the tubular mount.

7. The faucet of claim 1, wherein the cup is formed separately from and coupled to the tubular mount.

8. The faucet of claim 1, wherein the locking assembly includes a nut, which locks to the mount in the first position and does not lock to the mount in the second position, wherein the first and second positions are separated by ninety degrees or less.

9. The faucet of claim 8, wherein in the second position, the locking assembly can slide along and relative to the mount and relock in a third position, in which the locking assembly is at a different distance from the base than in the first or second positions.

10. The faucet of claim 1, wherein the faucet is a swing spout faucet, a pull out faucet, or a pull down faucet.

11. A faucet comprising:
an external body having a base, which is configured to mount to a support, and a spout, which extends from the base;
a valve cartridge configured to control a flow of water to the spout;
a valve structure configured to support the valve cartridge and comprising a mount having a tubular portion that extends downwardly beyond a bottom of the base, the tubular portion comprising a first plurality of corrugations that are aligned in a first row in a longitudinal direction of the tubular portion; and
a locking assembly that detachably locks to the tubular portion through at least one corrugation of the first plurality of corrugations in a first rotational position and that is slidable along an entire length of the first plurality of corrugations of the tubular portion in the longitudinal direction relative to the first plurality of corrugations in a second rotational position.

12. The faucet of claim 11, wherein the tubular portion comprises a second plurality of corrugations spaced apart circumferentially from the first plurality of corrugations, the second plurality of corrugations are aligned in a second row in the longitudinal direction, the locking assembly detachably locks to the tubular portion through at least one corrugation of the second plurality of corrugations in the first rotational position, and the locking assembly is slidable in the longitudinal direction relative to the second plurality of corrugations in the second rotational position.

13. The faucet of claim 12, wherein the tubular portion comprises at least one smooth section extending in the longitudinal direction between the first and second pluralities of corrugations.

14. The faucet of claim 13, wherein the at least one smooth surface comprises:
a first smooth section extending in the longitudinal direction between a first side of the first plurality of corrugations and a first side of the second plurality of corrugations; and
a second smooth section extending in the longitudinal direction between a second side of the first plurality of corrugations and a second side of the second plurality of corrugations, such that the first and second smooth sections are separated from one another.

15. The faucet of claim 11, wherein the valve structure comprises a cup that is disposed in the external body, extends from a top of the mount, and receives and supports the valve cartridge therein.

16. The faucet of claim 15, wherein the cup and the mount are a unitary one-piece component.

17. The faucet of claim 11, further comprising a base mount disposed between the external body and the valve structure, wherein the base mount comprises an annular body having at least one notch, the mount of the valve structure comprises a finger extending outwardly and in the longitudinal direction relative to a wall comprising the first plurality of corrugations, and the finger engages the at least one notch to set a height of the valve structure relative to the support.

18. The faucet of claim 17, wherein the at least one notch of the base mount comprises:
a first notch extending a first depth in the longitudinal direction from a top of the annular body; and
a second notch offset radially around the annular body from the first notch and extending a second depth in the longitudinal direction from the top of the annular body,
wherein the valve structure extends a first height above the support with the finger engaging the first notch, the valve structure extends a second height above the support with the finger engaging the second notch, and the first height is different than the second height.

* * * * *